United States Patent [19]

Haley

[11] 4,022,613
[45] May 10, 1977

[54] METALLURGICAL MATERIAL AND PROCESS FOR TREATING IRON OR STEEL THEREWITH

[75] Inventor: George D. Haley, Greenville, Pa.

[73] Assignee: R. C. Metals, Inc., Greenville, Pa.

[22] Filed: Aug. 28, 1975

[21] Appl. No.: 608,789

[52] U.S. Cl. .................................. 75/53; 75/129
[51] Int. Cl.$^2$ .................................. C21C 7/00
[58] Field of Search .......................... 75/53, 129

[56] References Cited

UNITED STATES PATENTS

| | | | |
|---|---|---|---|
| 2,119,521 | 6/1938 | Brown | 75/129 |
| 2,405,278 | 8/1946 | Vance | 75/129 |
| 2,481,599 | 9/1949 | Kinzel | 75/129 |
| 2,527,829 | 10/1950 | Leitten | 75/129 |
| 2,569,146 | 9/1951 | Balkcom | 75/129 |
| 2,785,970 | 3/1957 | Loria | 75/129 |
| 3,841,861 | 10/1974 | Miltenberger | 75/53 |

*Primary Examiner*—Peter D. Rosenberg
*Attorney, Agent, or Firm*—Brown, Murray, Flick & Peckham

[57] ABSTRACT

An alloying addition agent for iron or steel baths comprising a mixture of a ferroalloy, an oxide of the desired alloying element and silicon carbide. The oxygen in the oxide enhances an exothermic reaction with silicon carbide to maintain the temperature of the bath. At the same time, the reaction produces very little smoke which normally results from prior art addition agents of this type, thereby reducing pollution of the surrounding atmosphere.

5 Claims, No Drawings

METALLURGICAL MATERIAL AND PROCESS FOR TREATING IRON OR STEEL THEREWITH

BACKGROUND OF THE INVENTION

As is known, after molten steel has been tapped from a furnace into a ladle, it is customary to make additions to the melt in the ladle in order to add alloying agents and produce a product of the desired analysis. Normally, alloying additions are added as ferroalloys such as ferromanganese or ferrochromium, etc. These additions are made by simply introducing the addition agent into the bath as lumps or in suitable containers, such as steel sheet cans or combustible containers. Since the added material is relatively cool, it can reduce the temperature of the melt to the point where problems are encountered when the ladle is poured into ingot molds or the like.

To avoid the problem of cooling by alloying additions, the molten bath must be heated in the furnace to a much higher temperature than otherwise would be necessary, or an exothermic material must be placed in the ladle with the additions in order to create heat that will offset the cooling additions. In the past, such an exothermic reaction has been provided by introducing the ferroalloy, such as ferromanganese, mixed with sodium nitrate and silicon. This results in an exothermic reaction between the sodium nitrate and silicon but results in dense clouds of smoke and a noxious sodium oxide vapor which, of course, pollutes the surrounding atmosphere. Furthermore, the use of sodium nitrate may result in undesirable additions of nitrogen and other inclusions in the melt.

It has been well known for some time that ladle additions of silicon carbide can have beneficial effects in molten steel. Silicon carbide can be used to add silicon and/or carbon; however, more importantly, it produces an exothermic chemical reaction which results in the generation of heat. For that matter, silicon carbide has been mixed with ferroalloys in the past to generate heat and overcome the cooling effect of the alloying additions as is described, for example, in Miltenberger U.S. Pat. No. 3,841,861.

SUMMARY OF THE INVENTION

In accordance with the present invention, a new and improved alloying mixture for iron or steel melts is provided wherein the exothermic characteristics of silicon carbide are enhanced, and more heat is generated in the bath, by mixing with the silicon carbide not only a ferroalloy but also an oxide of the alloying element. The oxygen in the oxide readily combines with the silicon to form silicon dioxide with rises to the slag. The alloying element of the oxide, now freed from oxygen, goes into solution in the molten bath.

The above and other objects and features of the invention will become apparent from the following detailed description of a preferred embodiment of the invention.

DESCRIPTION OF THE PREFERRED EMBODIMENT

In carrying out the invention, a ferroalloy such as ferrochromium or ferromanganese is mixed with chromium oxide or manganese oxide, for example, together with silicon carbide. The ferroalloy, the oxide and the silicon carbide are preferably 8 mesh and finer in size. The mixture consists of about 1–10% by weight of the oxide, about 5–20% by weight of silicon carbide and the remainder a ferroalloy, such as ferromanganese or ferrochromium. A preferred composition comprises 5% by weight of the oxide, 15% by weight of silicon carbide and the remainder ferroalloy.

The mixture is preferably placed in cans which are thrown into the molten melt during or after it has been tapped into a ladle. Although cans are preferred, the mixtures may be added loose or agglomerated into bricks or pellets. The cans rapidly pass through the slag and into the molten bath where the oxide reacts with silicon carbide to form the alloying element, silicon dioxide which rises to the slag and possibly carbon monoxide or carbon dioxide. The heat generated in the exothermic reaction between the silicon carbide and the oxide is much greater than is the case where, for example, only a mixture of silicon carbide and the ferroalloy is added. At the same time, very little smoke and/or fume is given off by the exothermic reaction, eliminating the possibility of air pollution.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In the manufacture of iron or steel, the steps of depositing in a molten bath thereof a mixture of a ferroalloy, in oxide of the alloying element in the ferroalloy and silicon carbide, whereby the oxide of the alloying element and the silicon carbide will react in an exothermic reaction.

2. The method of claim 1, wherein said mixture comprises about 1–10% of the oxide, about 5–20% of silicon carbide and the remainder a ferroalloy.

3. The method of claim 1, wherein the oxide is present in said mixture in about 5% by weight, silicon carbide is present in the mixture in about 15% by weight and the remainder comprises a ferroalloy.

4. An alloying addition agent for iron and steel baths comprising a ferroalloy mixed with an oxide of the alloying agent in the ferroalloy and silicon carbide.

5. The addition agent of claim 4 wherein the mixture comprises about 1–10% of the oxide, about 5–20% of silicon carbide and the remainder a ferroalloy.

* * * * *

UNITED STATES PATENT OFFICE
CERTIFICATE OF CORRECTION

Patent No. 4,022,613      Dated May 10, 1977

Inventor(s) George D. Haley

It is certified that error appears in the above-identified patent and that said Letters Patent are hereby corrected as shown below:

Claim 1, line 3, change "in" (first occurrence) to --an--.

Signed and Sealed this nineteenth Day of July 1977

[SEAL]

Attest:

RUTH C. MASON
*Attesting Officer*

C. MARSHALL DANN
*Commissioner of Patents and Trademarks*